(12) United States Patent
Fleischmann et al.

(10) Patent No.: US 10,046,733 B2
(45) Date of Patent: Aug. 14, 2018

(54) BELT RETRACTOR

(71) Applicant: TAKATA AG, Aschaffenburg (DE)

(72) Inventors: Robert Fleischmann, Neu-Ulm/Pfuhl (DE); Armin Toth, Dornstadt (DE); Christoph Pechhold, Erbach (DE); Thomas Schwer, Illertissen (DE); Karl-Friedrich Haug, Illerkirchberg (DE)

(73) Assignee: JOYSON SAFETY SYSTEMS GERMANY GMBH, Aschaffenburg (DE)

( * ) Notice: Subject to any disclaimer, the term of this patent is extended or adjusted under 35 U.S.C. 154(b) by 219 days.

(21) Appl. No.: 14/915,201

(22) PCT Filed: Aug. 13, 2014

(86) PCT No.: PCT/DE2014/200400
§ 371 (c)(1),
(2) Date: Feb. 26, 2016

(87) PCT Pub. No.: WO2015/028014
PCT Pub. Date: Mar. 5, 2015

(65) Prior Publication Data
US 2016/0200289 A1    Jul. 14, 2016

(30) Foreign Application Priority Data

Aug. 27, 2013   (DE) ........................ 10 2013 217 018

(51) Int. Cl.
*B60R 22/34*   (2006.01)
*B60R 22/28*   (2006.01)
*B60R 22/46*   (2006.01)

(52) U.S. Cl.
CPC .... *B60R 22/3413* (2013.01); *B60R 2022/287* (2013.01); *B60R 2022/288* (2013.01); *B60R 2022/4642* (2013.01)

(58) Field of Classification Search
CPC .......... B60R 22/3413; B60R 2022/287; B60R 2022/288
(Continued)

(56) References Cited

U.S. PATENT DOCUMENTS 5,799,893 A    9/1998   Miller, III et al.
6,250,579 B1   6/2001   Bannert et al.
(Continued)

FOREIGN PATENT DOCUMENTS

CN          101341050 A      1/2009
DE     10 2005 011 977 A1    9/2007
(Continued)

OTHER PUBLICATIONS

International Search Report dated Jan. 30, 2015 Issued in PCT/DE2014/200400.
(Continued)

*Primary Examiner* — Sang K Kim
(74) *Attorney, Agent, or Firm* — Gordon Rees Scully Mansukhani, LLP

(57) ABSTRACT

A belt retractor for a safety belt, having a belt reel for winding or unwinding the safety belt, and a belt force limiting installation which comprises a first and second torsion bar for limiting belt force. The belt retractor has a free-wheeling transmission which operates depending on the rotation angle and which after activation of the belt force limiting installation initially leaves the second torsion bar so as to be inactive, while the first torsion bar for limiting belt force is already being twisted, and the free-wheeling transmission activates the second torsion bar as soon as the (Continued)

free-wheeling transmission has been rotated about a predefined maximum free-wheeling rotation angle.

12 Claims, 3 Drawing Sheets

(58) Field of Classification Search
USPC .................................................. 242/379.1
See application file for complete search history.

(56) References Cited

U.S. PATENT DOCUMENTS

| 6,648,260 | B2 | 11/2003 | Webber et al. |
| 2002/0017583 | A1 | 2/2002 | Yano et al. |
| 2003/0019969 | A1 | 1/2003 | Webber et al. |
| 2005/0224622 | A1* | 10/2005 | Zolkower ........... B60R 22/3413 242/379.1 |
| 2005/0284978 | A1 | 12/2005 | Zolkower |
| 2007/0158487 | A1 | 7/2007 | Glinka |
| 2010/0301152 | A1 | 12/2010 | Fleischmann et al. |

FOREIGN PATENT DOCUMENTS

| EP | 0 913 300 A1 | 5/1999 |
| EP | 1 738 976 A1 | 1/2007 |
| JP | 2001347921 A | 12/2001 |
| WO | WO 97/06992 | 2/1997 |
| WO | WO 03/010030 A2 | 2/2003 |
| WO | WO 2015/028014 A1 | 3/2015 |

OTHER PUBLICATIONS

Chinese Office Action and Search Report dated Apr. 26, 2017 issued in Chinese Application No. 201480047746.6.

* cited by examiner

BELT RETRACTOR

CROSS-REFERENCE TO A RELATED APPLICATION

This application is a National Phase Patent Application of International Patent Application Number PCT/DE2014/200400; filed on Aug. 13, 2014, which claims priority of German Patent Application Number DE 10 2013 217 018.1, filed on Aug. 27, 2013.

BACKGROUND

The invention relates to a belt retractor.

A belt retractor of this type is known from European patent application EP 0 913 300 A1. The previously known belt retractor has a belt reel for winding or unwinding a safety belt, and is equipped with a belt force limiting installation. The belt force limiting installation comprises a first and a second torsion bar. Activation of the second torsion bar is performed by means of a pyrotechnical installation.

The invention is based on the object of stating a belt retractor in which a switchable force profile of the belt force limiting installation may be achieved in a particularly simple manner.

SUMMARY

Accordingly, it is provided according to the invention that the belt retractor has a free-wheeling transmission which operates depending on the rotation angle and which after activation of the belt force limiting installation initially leaves the second torsion bar so as to be inactive, while the first torsion bar for limiting belt force is already being twisted, and the free-wheeling transmission activates the second torsion bar as soon as the free-wheeling transmission has been rotated about a predefined maximum free-wheeling rotation angle.

A substantial advantage of the belt retractor according to the invention lies in that the belt force limiting installation operates with a progressive force profile, dependent on extraction of the belt web. The progressive force profile dependent on extraction of the belt web is caused by the free-wheeling transmission which is provided according to the invention and which activates the second torsion bar depending on extraction of the belt web. Activation of the second torsion bar according to the invention is only performed once the free-wheeling transmission has been rotated about a predefined maximum free-wheeling rotation angle. Moreover, on account of free-wheeling, weight-dependent switching of the belt retention force may be advantageously achieved, specifically independent of the occupant weight of the occupant who is protected by the safety belt, since a comparatively heavy occupant will reach the higher force level initiated by the second torsion bar earlier than a comparatively lighter vehicle occupant. In other words, by way of rotation-angle-dependent switching of the free-wheeling transmission provided according to the invention, switching of the force level dependent on the vehicle occupant weight of the occupant may be achieved in a particularly simple manner.

It is seen as particularly advantageous that the free-wheeling transmission which operates depending on the rotation angle after activation of the belt force limiting installation enables free conjoint rotation of the second torsion bar, while the first torsion bar for limiting belt force is twisted, and the free-wheeling transmission deactivates free-wheeling of the second torsion bar and activates the second torsion bar as soon as the latter has been rotated about a predefined maximum free-wheeling rotation angle. In this design embodiment, conjoint rotation of the second torsion bar is thus enabled in the free-wheeling phase of the free-wheeling transmission.

Conjoint rotation of the second torsion bar as described may be achieved in a particularly simple manner, when a first bar end of the first torsion bar and a first bar end of the second torsion bar are coupled by way of a coupling transmission and in the case of rotation of the first bar end of the first torsion bar, the first bar end of the second torsion bar is conjointly rotated, and the second bar end of the second torsion bar is connected to the free-wheeling transmission.

Preferably, the free-wheeling transmission deactivates free-wheeling of the second torsion bar in that the former blocks rotation of the second bar end of the torsion bar.

Alternatively, it may be provided that the free-wheeling transmission is disposed between the second torsion bar and the coupling transmission. In this design embodiment, no conjoint rotation of the second torsion bar is created in the free-wheeling phase of the free-wheeling transmission, the second torsion bar being twisted as soon as the free-wheeling transmission has covered the maximum free-wheeling rotation angle thereof.

With a view to the last-mentioned variant it is advantageous when a first bar end of the first torsion bar and the free-wheeling transmission are coupled by way of the coupling transmission, and in the case of rotation of the first bar end of the first torsion bar, initially the free-wheeling transmission is rotated and conjoint rotation of the first bar end of the second torsion bar is only performed once the free-wheeling transmission has been rotated about the predefined maximum free-wheeling rotation angle.

With a view to the design embodiment of the free-wheeling transmission it is seen as particularly advantageous when the free-wheeling transmission has at least one control element which during free-wheeling of the free-wheeling transmission is moved and after a predefined maximum motion stroke impacts on a stop by way of which the further motion of the control element is blocked. A predefined free-wheeling rotation angle may be set in a particularly simple manner by means of conjointly rotating control elements and assigned stops.

The free-wheeling transmission may be implemented as a thread with a nut, running in blocking manner, for example. However, it is seen as particularly advantageous when the free-wheeling transmission operates in multiple stages and has two or more rotary elements, in particular in the form of rotary disks, disposed in a cascading manner, which are successively set in rotating motion. Accordingly, it is provided in a particularly preferred design embodiment of the belt retractor that the free-wheeling transmission has at least one first rotary element and a second rotary element which is downstream of the first rotary element, wherein in a first phase of free-wheeling initially the first rotary element is rotated in relation to the second rotary element until a control element which is disposed on the first rotary element impacts on a stop of the second rotary element and the first rotary element subsequently conjointly rotates the second rotary element.

Stops may be provided in a particularly simple manner by guide grooves; accordingly, it is seen as advantageous when as guide groove is disposed on that side of the second rotary element that faces the first rotary element, and the control element of the first rotary element is guided in this guide groove, wherein the guide groove limits the maximum relative rotation angle of the first rotary element in relation to the second rotary element. A control element which after a predefined maximum motion stroke of the second rotary element impacts on a downstream stop is preferably disposed on that side of the second rotary element that faces away from the first rotary element.

In terms of the control element of the second rotary element it is seen as advantageous when the control element of the second rotary element is guided in a guide groove of a transmission element which is downstream of the second rotary element, and the maximum motion stroke predefined for the control element of the second rotary element is limited by the length of the guide groove of the transmission element.

The transmission element may be a rotationally fixed element which per se cannot perform a rotating motion and thus limits free-wheeling of the free-wheeling transmission, as soon as the second rotary element has been rotationally displaced in relation to the transmission element. Alternatively, the transmission element may also be a rotating transmission element which forms a "third" rotary element of the free-wheeling transmission and enables free-wheeling of the free-wheeling transmission in a manner similar to that of the first and second rotary elements.

Preferably, the rotary elements are formed by entrainment disks having in each case one pin-shaped control element. The longitudinal axis of the pin-shaped control elements in each case preferably extends perpendicularly away from the respective entrainment disk, in particular in an axially offset manner in the direction of the respective downstream entrainment disk or of the transmission element, respectively.

The first torsion bar and the second torsion bar are preferably coupled by way of a coupling transmission.

The coupling transmission preferably has a first gear wheel which is connected to the first bar end of the first torsion bar, and a second gear wheel which is connected to the first bar end of the second torsion bar, wherein the two gear wheels are permanently meshed.

BRIEF DESCRIPTION OF THE DRAWINGS

The invention will be set forth in more detail hereunder by means of exemplary embodiments; in the figures and in an exemplary manner.

DETAILED DESCRIPTION

For clarity, the same reference signs are used throughout for identical or equivalent components in the figures.

Figure 1:
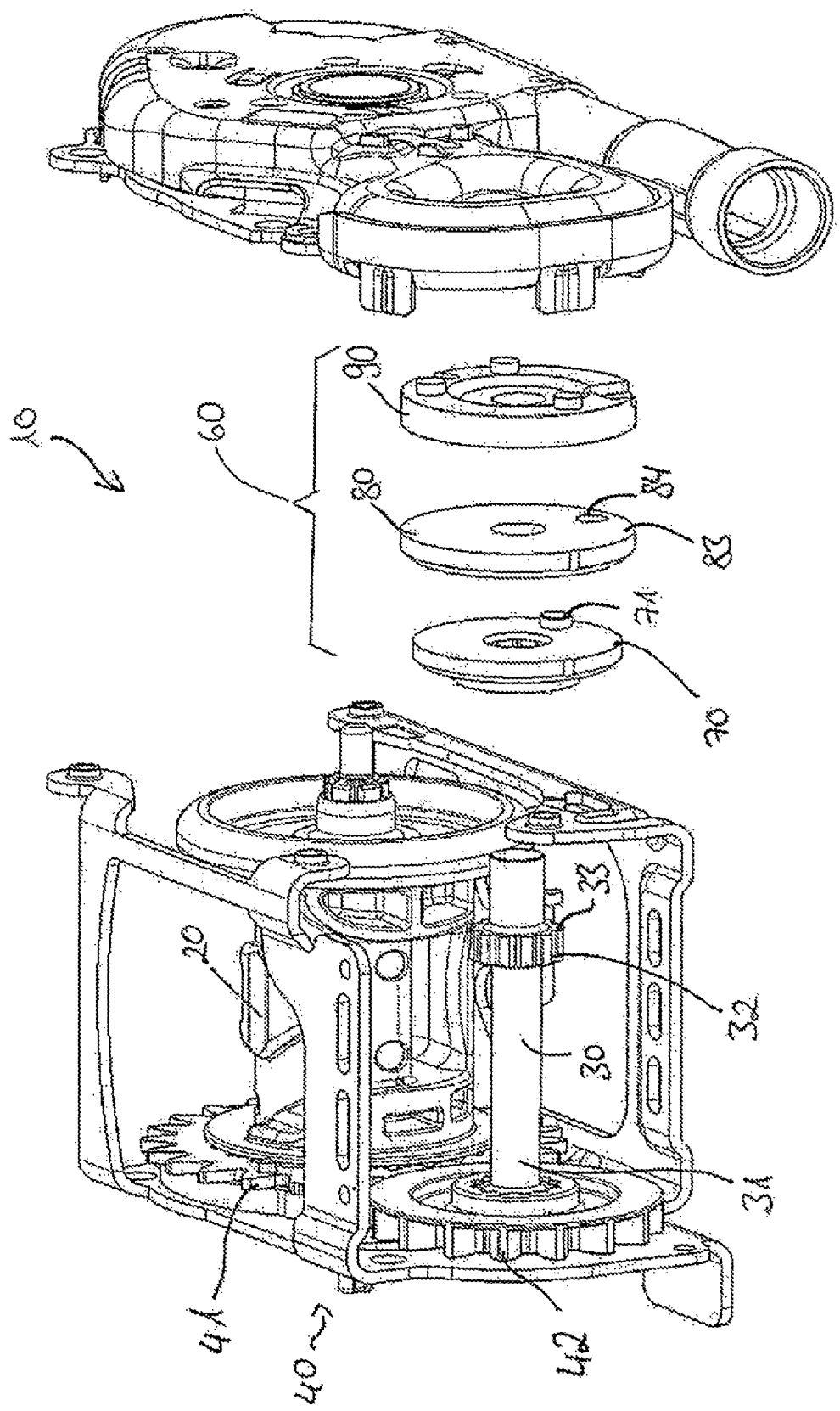
FIGS. 1 and 2 show an exemplary embodiment for a belt retractor according to the invention in an exploded three-dimensional illustration, wherein dissimilar points of view are illustrated in the two FIGS. 1 and 2.

FIG. 1 shows a belt retractor 10 having a belt reel 20 for winding or unwinding a safety belt (not illustrated). The belt retractor 10 has a first torsion bar and a second torsion bar 30, the first torsion bar being disposed within the belt reel 20 and thus not being visible in FIGS. 1 and 2.

The two torsion bars are disposed so as to be mutually parallel and are interconnected by way of a coupling transmission 40. The coupling transmission 40 has a first gear wheel 41 and a second gear wheel 42 which is coupled to the first gear wheel 41 or meshes with the first war wheel 41, respectively.

The first gear wheel 41 is connected to a bar end of the first torsion bar in a rotationally fixed manner and in the case of rotation of the first torsion bar is set in rotating motion.

The second gear wheel 42 is connected to a first bar end 31 of the second torsion bar 30 and drives the latter in the case of rotating motion of the first gear wheel 41 or of the first torsion bar, respectively.

A second bar end 32 of the second torsion bar 30 is connected to a free-wheeling transmission 60 which comprises a first rotary element 70, a second rotary element 80, and a transmission element 90.

Figure 2:
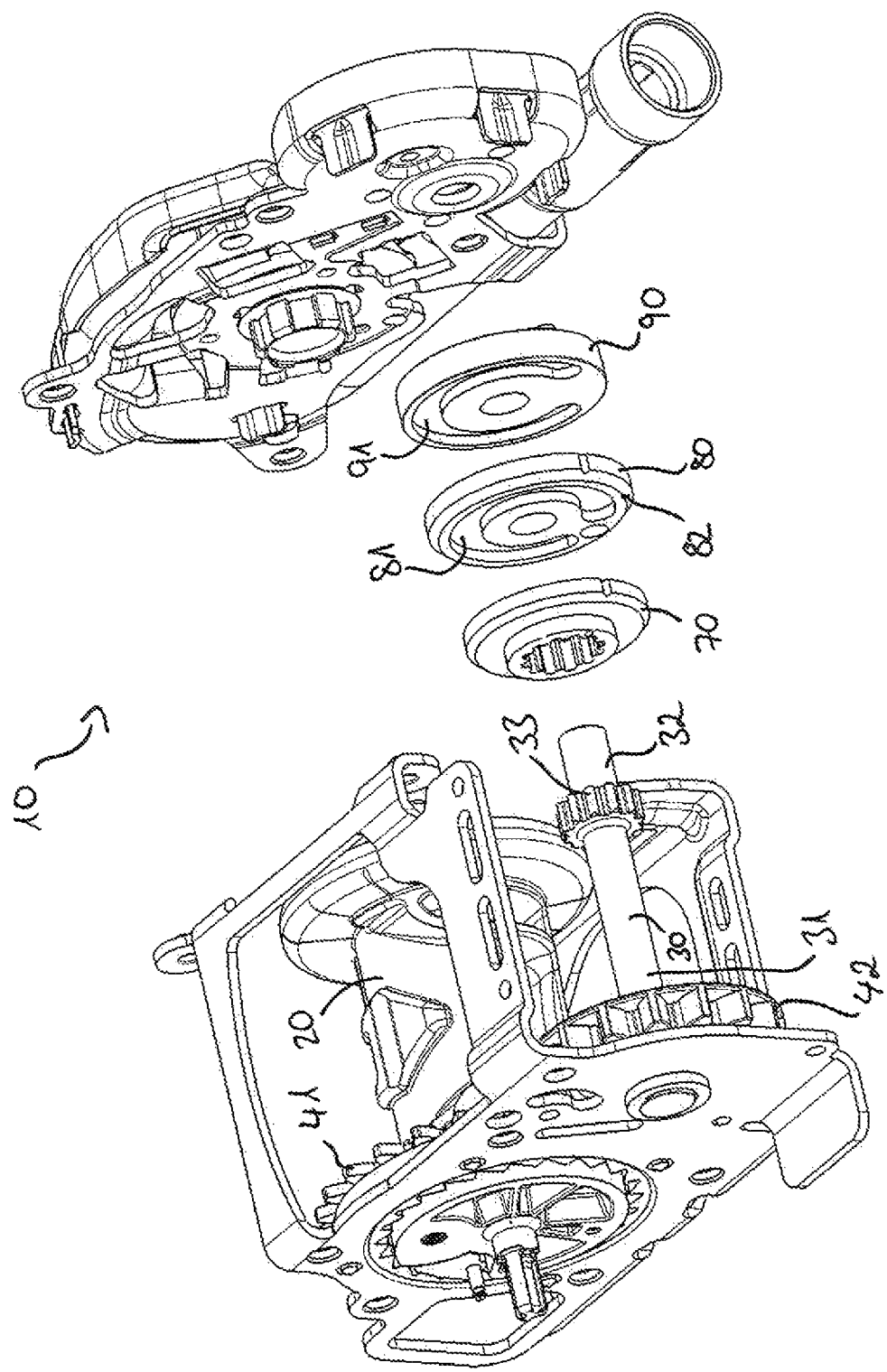

It can be seen in FIGS. 1 and 2 that the first rotary element 70 is push-fitted to a gear-wheel portion 33, which is disposed in the region of the second bar end 32 of the second torsion bar 30, and is thus connected to the second torsion bar 30 in a rotationally fixed manner. The first rotary element 70 has a pin-shaped control element 71 which is disposed so as to be axially offset in relation to the rotation axis or the longitudinal axis, respectively, of the second torsion bar 30 and in the case of rotating motion of the first rotary element 70 is set in arcuate motion. The pin-shaped control element 71 engages in a guide groove 81 of the second rotary element 80. The guide groove 81 is disposed on that side 82 of the second rotary element 80 that faces the first rotary element 70.

A pin-shaped control element 84 is disposed on that side 83 of the second rotary element 80 that faces away from the first rotary element 70 or on that side of the second rotary element 80 that faces the transmission element 90, said pin-shaped control element 84 being axially offset in relation to the longitudinal axis or the rotation axis, respectively, of the second torsion bar 30 and in the case of rotating motion of the second rotary element 80 being set in arcuate motion. The pin-shaped control element 84 engages in an arcuate guide groove 91 in the transmission element 90.

The rotary elements 70 and 80 are preferably disk-shaped.

The two torsion bars, the coupling transmission 40, and the free-wheeling transmission 60 form a belt force limiting installation which in the case of activation operates depending on the rotation angle as follows:

In the case of activation of the belt force limiting installation, the first torsion rod which is disposed within the belt reel 20 is initially twisted, on account of which rotary motion of the first gear wheel 41 of the coupling transmission 40 is created. On account of the rotation of the first gear wheel 41, the second gear wheel 42 is conjointly moved, such that the second torsion bar 30 is set in rotary motion.

In the context of the rotary motion of the second torsion bar 30, the second bar end 32 will rotate the first rotary element 70, on account of which the pin-shaped control element 71 is moved in the guide groove 81 of the downstream second rotary element 80. Since the second bar end 32 of the second torsion bar 30 in this phase may still freely rotate, the second torsion bar 30 is as yet inactive and does not exert any retention force on the safety belt of the belt retractor.

As soon as the pin-shaped control element 71 has reached the end of the guide groove 81 in the second rotary element 80 and impacts on the groove end of the guide groove 81, which forms a stop for the control element 71, the second rotary element 80 is conjointly rotated by the pin-shaped control element 71 of the first rotary element 70.

In the context of the conjoint rotation of the second rotary element 80, the pin-shaped control element 84 is now moved in the guide groove 91 of the transmission element 90 until said pin-shaped control element 84 impacts on the groove end of the guide groove 91. The groove end of the guide groove 91 forms a stop by way of which further rotary motion of the second rotary element 80 is prevented if and when, as is assumed here in an exemplary manner, the transmission element 90 is connected to the frame of the belt retractor 10 in a rotationally fixed manner.

As soon as the pin-shaped control element 84 of the second rotary element 80 has thus reached the groove end in the guide groove 91, further rotation of the first and second rotary elements 70 and 80 and thus further rotation of the second bar end 32 of the second torsion bar 30 becomes impossible. If, as a result of corresponding torsion of the first torsion bar, the first gear wheel 41 of the coupling transmission 40 rotates the second gear wheel 42 any further, subsequent twisting of the second torsion bar 30 will arise and thus an additional belt retention force acting on the safety belt will be created.

Figure 3:
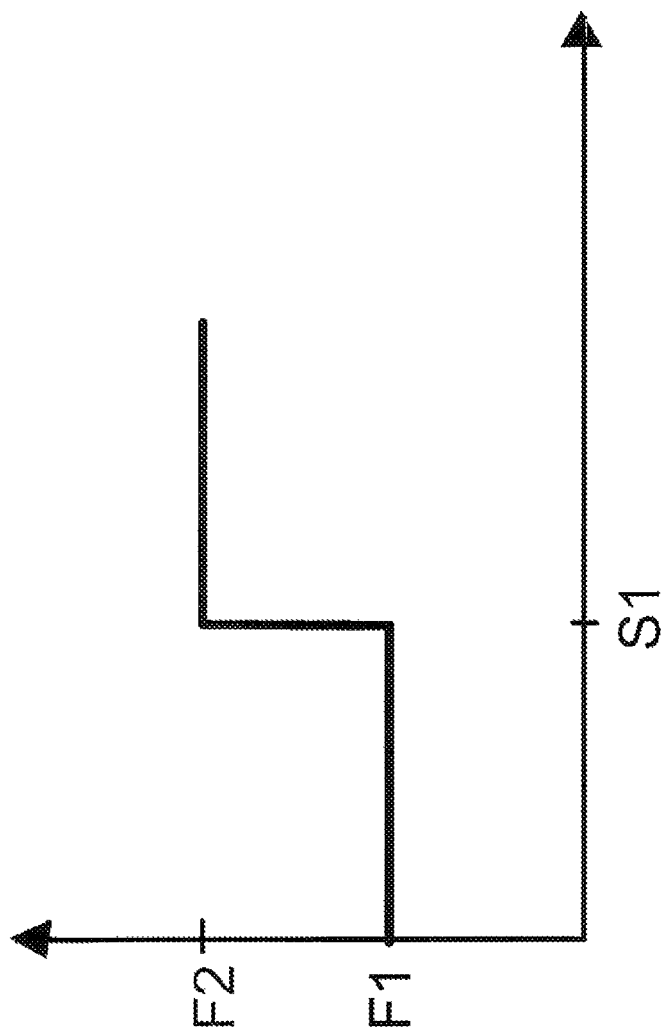
FIG. 3 shows the switching behavior of the belt retractor according to FIGS. 1 and 2, in the form of a diagram which illustrates belt retention force in relation to belt web extraction.

The functioning of the free-wheeling transmission 60 is visualized in a diagram in FIG. 3, showing the profile of belt retention force F in relation to belt web extraction S. It can be seen that only the belt retention force F=F1 which is exerted by way of the first torsion bar of the belt retractor 10 initially acts.

As soon as the free-wheeling transmission 60 blocks free-wheeling of the second torsion bar 30, this being the case after the pin-shaped control element 84 has run against the groove end of the guide groove 91 in the transmission element 90, the second bar end 32 is blocked, the second torsion bar is activated on account thereof, and an increase in the belt retention force to the value F=F2 arises. The force value F=F2 is the result of an interaction between the torsion forces of both torsion bars.

The belt web extraction length S1 at which the second torsion bar 30 is additionally switched and an increase in the belt retention force arises may be determined by the gearing ratio of the coupling transmission 40 and by the design concept of the free-wheeling transmission 60, for example by determining the rotation angles by which the pin-shaped control elements 71 and 84 may rotate in the guide grooves 81 or 91, respectively, assigned thereto.

In the exemplary embodiment according to FIGS. 1 and 2, two rotary elements 70 and 80 are provided between the second bar end 32 of the second torsion bar 30 and the transmission element 90 which is attached in a rotationally fixed manner; this number is to be understood in a merely exemplary manner, as instead of two rotary elements there may also be only a single rotary element, or else there may be more than two rotary elements which are disposed behind one another in a cascading manner. The higher the number of rotary elements which are disposed behind one another in a cascading manner, the greater the resulting unwound length of the safety belt prior to the retention force of the second torsion bar 30 being additionally switched.

LIST OF REFERENCE SIGNS

10 Belt retractor
20 Belt reel
30 Torsion bar
31 First bar end
32 Second bar end
33 Gear-wheel portion
40 Coupling transmission
41 First gear wheel
42 Second gear wheel
60 Free-wheeling transmission
70 First rotary element
71 Control element
80 Second rotary element
81 Guide groove
82 Facing side
83 Facing-away side
84 Control element
90 Transmission element
91 Guide groove
F1 Belt retention force
F2 Belt retention force
S Belt web extraction
S1 Belt web extraction length

The invention claimed is:

1. A belt retractor for a safety belt, having a belt reel for winding or unwinding the safety belt, and a belt force limiting installation which comprises a first and second torsion bar for limiting belt force, wherein
the belt retractor has a free-wheeling transmission which operates depending on the rotation angle and which after activation of the belt force limiting installation initially leaves the second torsion bar so as to be inactive, while the first torsion bar for limiting belt force is already being twisted,
the free-wheeling transmission activates the second torsion bar as soon as the free-wheeling transmission has been rotated about a predefined maximum free-wheeling rotation angle,
the free-wheeling transmission has at least one first rotary element and a second rotary element which is downstream of the first rotary element, and
in a first phase of free-wheeling initially the first rotary element is rotated in relation to the second rotary element until a first control element that is disposed on the first rotary element impacts on a stop of the second rotary element and the first rotary element subsequently conjointly rotates the second rotary element.

2. The belt retractor as claimed in claim 1, wherein at least one of the first control element and a second control element that is disposed on the second rotary element is moved during free-wheeling of the free-wheeling transmission and after a predefined maximum motion stroke impacts on a stop by way of which the further motion of the at least one of the first control element and the second control element is blocked.

3. The belt retractor as claimed in claim 1, wherein
a guide groove is disposed on that side of the second rotary element that faces the first rotary element, and the first control element is moved in this guide groove, wherein the guide groove limits the maximum relative rotation angle of the first rotary element in relation to the second rotary element, and
a second control element, which after a predefined maximum motion stroke of the second rotary element impacts on a downstream stop, is disposed on a side of the second rotary element that faces away from the first rotary element.

4. The belt retractor as claimed in claim 3, wherein
the second control element is guided in a guide groove of a transmission element which is downstream of the second rotary element, and
the maximum motion stroke predefined for the second control element is limited by the length of the guide groove of the transmission element.

5. The belt retractor as claimed in claim 1, wherein
the first rotary element and the second rotary element are formed by entrainment disks, the entrainment disks including either the first control element or a second control element, respectively,
the first control element and the second control element are pin-shaped, and
the longitudinal axis of the first control element and the second control element in each case extends perpendicularly away from the respective entrainment disk.

6. The belt retractor as claimed in claim 1, wherein the first torsion bar and the second torsion bar are coupled by way of a coupling transmission.

7. The belt retractor as claimed in claim 6, wherein the coupling transmission has a first gear wheel which is connected to the first bar end of the first torsion bar, and a second gear wheel which is connected to the first bar end of the second torsion bar, wherein the two gear wheels are permanently meshed.

8. The belt retractor as claimed in claim 1, wherein
the free-wheeling transmission which operates depending on the rotation angle after activation of the belt force limiting installation enables free conjoint rotation of the second torsion bar, while the first torsion bar for limiting belt force is twisted, and
the free-wheeling transmission deactivates free-wheeling of the second torsion bar and activates the second torsion bar as soon as the latter has been rotated about the predefined maximum free-wheeling rotation angle.

9. The belt retractor as claimed in claim 8, wherein
a first bar end of the first torsion bar and a first bar end of the second torsion bar are coupled by way of the coupling transmission and in the case of rotation of the first bar end of the first torsion bar, the first bar end of the second torsion bar is conjointly rotated, and
the second bar end of the second torsion bar is connected to the free-wheeling transmission.

10. The belt retractor as claimed in claim 1, wherein the free-wheeling transmission deactivates free-wheeling of the second torsion bar in that the former blocks rotation of the second bar end of the second torsion bar.

11. The belt retractor as claimed in claim 1, wherein the free-wheeling transmission is disposed between the second torsion bar and the coupling transmission.

12. The belt retractor as claimed in claim 11, wherein a first bar end of the first torsion bar and the free-wheeling transmission are coupled by way of the coupling transmission, and in the case of rotation of the first bar end of the first torsion bar, initially the free-wheeling transmission is rotated and twisting of the first bar end of the second torsion bar is only performed once the free-wheeling transmission has been rotated about the predefined maximum free-wheeling rotation angle.

* * * * *